United States Patent [19]

Ross

[11] 3,919,571

[45] Nov. 11, 1975

[54] BEARING FOR THE ROTOR OF A DYNAMO-ELECTRIC MACHINE PROVIDED WITH A SUPERCONDUCTING WINDING

[75] Inventor: John S. H. Ross, Northumberland, England

[73] Assignee: BBC Brown Boveri & Company Limited, Baden, Switzerland

[22] Filed: Nov. 29, 1973

[21] Appl. No.: 419,932

[30] Foreign Application Priority Data
Dec. 7, 1972 Switzerland............... 17755/72

[52] U.S. Cl. .............. 310/40; 308/183; 310/52; 310/90
[51] Int. Cl.² .......................................... H02K 9/00
[58] Field of Search ......... 310/10, 198, 40, 201, 52, 310/205, 90, 64; 308/36, 37, 183, DIG. 4

[56] References Cited
UNITED STATES PATENTS

| | | | |
|---|---|---|---|
| 3,395,954 | 8/1968 | Boillat | 308/183 |
| 3,470,396 | 9/1969 | Kafka | 310/10 |
| 3,517,231 | 6/1970 | Massar | 310/52 |
| 3,609,418 | 9/1971 | Halas | 310/10 |
| 3,639,793 | 2/1972 | Appleton | 310/10 |
| 3,673,444 | 6/1972 | Kawabe | 310/10 |
| 3,675,102 | 7/1972 | Sidorov | 310/90 |
| 3,679,920 | 7/1972 | MacNab | 310/52 |
| 3,729,640 | 4/1973 | Ross | 310/52 |
| 3,731,865 | 5/1973 | Wood | 310/52 |
| 3,745,389 | 7/1973 | Lorch | 310/52 |

Primary Examiner—R. Skudy
Attorney, Agent, or Firm—Pierce, Scheffler & Parker

[57] ABSTRACT

The rotor of an electrical machine comprises two concentric parts one of which, preferably the outer part being in a region of normal temperature, the other part of the rotor, preferably the inner part being in a region of low temperature and provided with a superconducting winding. The two parts of the rotor are rigidly joined together at one end thereof, preferably at the driving end whereas at the other end of the rotor, preferably the non-driving end, the two rotor parts are provided with their own bearing journals located in a bearing box common to both journals.

5 Claims, 1 Drawing Figure

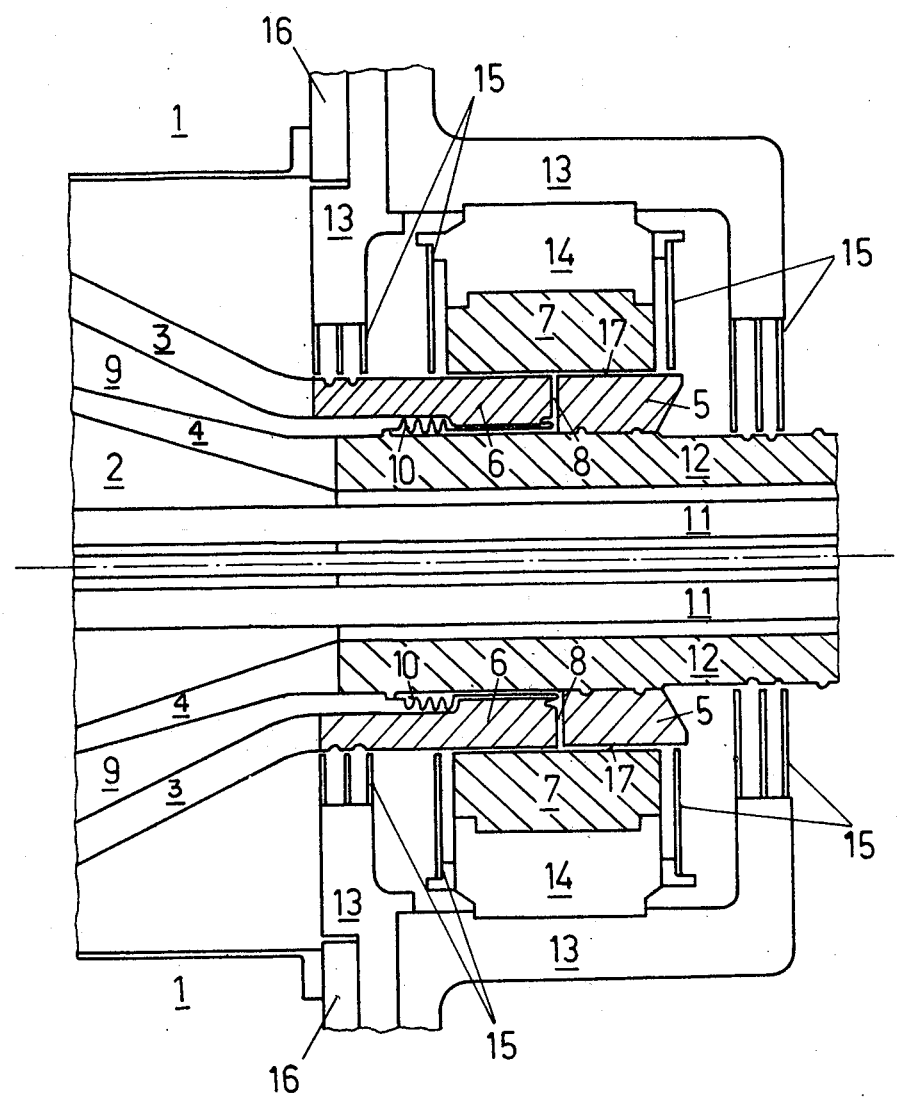

BEARING FOR THE ROTOR OF A DYNAMO-ELECTRIC MACHINE PROVIDED WITH A SUPERCONDUCTING WINDING

The present invention concerns an improved construction for a bearing for the rotor, comprising two concentric parts, of an electrical machine provided with superconducting rotor windings, one part of the rotor, preferably the outer part, being in a region of normal temperature and the other part, preferably the inner part, being in a region of low, i.e. superconductive temperature, the two parts of the rotor being rigidly joined together, preferably at the driving end.

As has been described in the publication of the Cryogenic Engineering Conference 1969 (Paper No. G-1), generator rotors which incorporate superconducting windings present the problem of screening the part of the rotor which is in the region of low temperature from those parts which are at normal temperature. In order to achieve effective screening, it has already been proposed that rotors be built which consist of a number of concentric parts such that the outer part of the rotor, which is in the region of normal temperatures, has no windings but serves solely as thermal and electrical screening for the inner part of the rotor. The inner part of the rotor incorporates superconducting windings cooled by liquid helium, for example. In order to keep the temperature drop as constant as possible an evacuated space is established between the two parts of the rotor.

With this known arrangement there arises the problem of creating a bearing for the part of the rotor at normal temperature and the part of the rotor fitted with superconducting windings, i.e. the part in the region of low temperature, such that this bearing is as far as possible free from stresses resulting from relative expansion of the two parts, and has appropriate axial tolerances.

Hitherto, in comparatively small experimental generators having rotors with superconducting windings the "cold" part of the rotor has been supported with respect to the "warm" part of the rotor by means of elastic elements. With generators of larger dimensions, however, this method can no longer be used owing to the large relative movements in the axial and tangential directions.

The object of the present invention is to create for the rotor, comprising two concentric parts, of an electrical machine, in particular a machine with superconducting rotor windings, a bearing which holds the two parts concentric and allows the relative axial movement of these two parts resulting from thermal expansion.

This object is achieved in that each part of the rotor has its own bearing journal located in a bearing box common to both journals, preferably at the non-driving end.

An advantage of this arrangement is that individual bearings for the warm and cold parts of the rotor are no longer necessary because the bearing journals of the warm and cold parts of the rotor can be incorporated in a common bearing box. In this way the concentricity of the two parts of the rotor with respect to each other is ensured, and there is no need for costly constructions such as are required if the individual parts of the rotor have separate bearings, self-aligning bearings, for example. Furthermore, the two-part bearing, i.e. a bearing journal for each part of the rotor, is located at only one end of the rotor, preferably at the non-driving end, while at the driving end the two parts of the rotor are rigidly joined together and have bearings of the usual kind.

It is also of advantage that the two bearing journals have the same outside diameter.

The merit of this is that the problem of lubrication can be solved in a simple manner because the outer surfaces of the bearing journals have the same peripheral speed, which prevents separation of the oil film in the bearing box and also allows easier and more accurate machining and adjustment of the bearings.

In another version of the invention a gap is located between the bearing journal of the part of the rotor in the region of normal temperatures and the part of the rotor in the region of low temperature. A gap of this nature between the two bearing journals is necessary in order to compensate the axial movement of the two parts of the rotor relative to each other since, depending on the length of the rotor, these axial movements can be as much as 30 mm at the non-driving end of the generator.

In another version, a bellows-type seal is located between the bearing journals of the part of the rotor in the region of normal temperatures and the shaft end of the part of the rotor in the region of low temperature. The purpose of this bellows is to seal the bearing from the evacuated and hence thermally insulating, space between the "warm" part of the rotor, which has no windings and serves as screening, and the "cold" part of the rotor fitted with, and cooled by, superconducting windings, thus maintaining the thermal insulation.

An example of the invention is shown schematically in the accompanying drawing, the single FIGURE of which is a central longitudinal section through the improved bearing of a rotor comprising two concentric parts.

With reference to the drawing, a generator, the stator of which is denoted 1, has a rotor 2 which consists of two concentric parts, namely an outer "warm" part 3 and an inner "cold" part 4, the latter being provided with superconducting windings and cooled, for example, by liquid helium which flows through ducts 11 passing through the hollow shaft portion 12 of a "cold" part 4 of the rotor on which the biasing journal 5 is mounted. The "warm" part 3 of the rotor likewise terminates in a hollow shaft portion 6 which surrounds the hollow shaft portion 12 and also functions as a bearing journal, the outer diameter of the shaft portion 6 being the same as that of the bearing journal 5. Whereas at the driving end of the rotor the concentric parts 3 and 4 of rotor 2 are rigidly joined together and have a common bearing (not shown), at the nondriving end, i.e. the end opposite to the driving end of rotor 2, the concentric shaft portions 6 and 12 of the two parts 3 and 4 of the rotor each have their own bearing journal 5 and 6 which are located in a common bearing box 7. The bearing box 7 is fixed to a bearing mounting 14 contained in a bearing housing 13 which comprises a number of parts. The bearing housing 13 is in turn fixed, together with bearing seals 15, to an end-shield 16 mounted on stator 1. Between the two bearing journals 5 and 6 there is a gap 8 of such dimensions that the relative axial and tangential movements of the two parts 3 and 4 of the rotor can be compensated by this gap 8. Between the warm part 3 and cold part 4 of the rotor 2 is an evacuated space 9 which provides thermal insulation, and this space 9 is sealed from the bearing, comprising common bearing box 7 and bearing journals 5 and 6, by a bellows-type seal 10. The bearing journals 5, and 6 are supported on an oil film 17 in bearing box 7.

Providing individual bearing journals 5 and 6 for each of the two parts 3 and 4 of the rotor 2 in a common bearing box 7 affords a simple method of compensating the axial movements resulting from differential thermal expansion of the two parts of the rotor 3 and 4, and of keeping these concentric to each other.

I claim:

1. A bearing structure for supporting the rotor of an electrical machine, said rotor being composed of two concentric parts, the outermost one of said parts being in a region of normal temperature and the other part being in a region of low temperature and provided with a superconducting winding, said concentric rotor parts being rigidly joined together at one end of the rotor, whereas at the opposite end of the rotor the concentric rotor parts terminate in independent concentric shaft portions each of which is provided with its own bearing journal located in a bearing box common to both journals at the other end of the rotor thereby permitting relative axial movement of the concentric rotor parts resulting from thermal expansion.

2. A bearing structure as defined in claim 1 wherein the outer part of the rotor constitutes the region of the rotor at normal temperature and the inner part of the rotor constitutes the region at low temperature and provided with the superconducting winding, wherein the two parts of the rotor are rigidly joined together at the driving end, and wherein the individual bearing journals for the two parts of the rotor and their common bearing box are located at the non-driving end of the rotor.

3. A bearing structure as defined in claim 1 wherein the individual bearing journals for said concentric rotor parts have the same diameter.

4. A bearing structure as defined in claim 1 and wherein a gap is provided between the bearing journals located in said common bearing box.

5. A bearing structure for a rotor as defined in claim 1 wherein said rotor includes an evacuated space between the two concentric parts thereof and wherein a bellows type seal is provided between the two concentric shaft portions thereof to seal off said evacuated space from the bearing journals.

* * * * *